March 13, 1928.  1,662,673
F. HURKA
GARDEN IMPLEMENT
Original Filed June 10, 1922   2 Sheets-Sheet 1
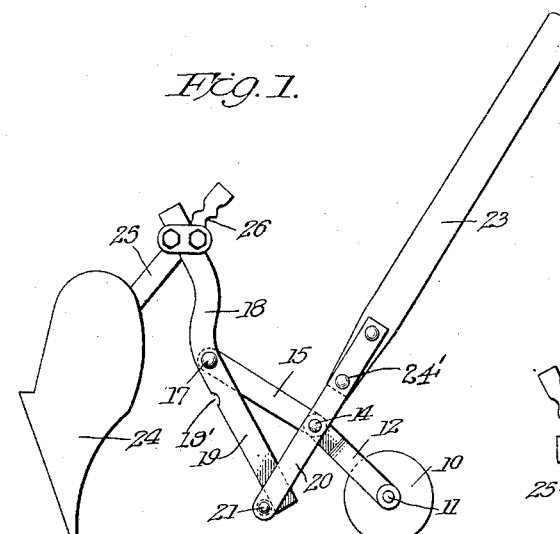
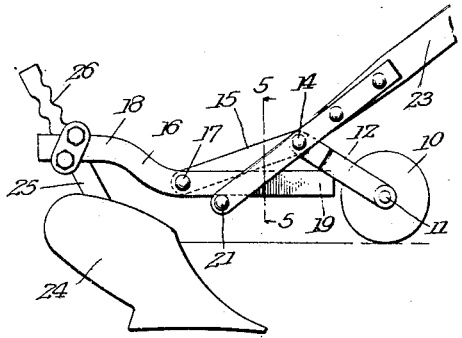
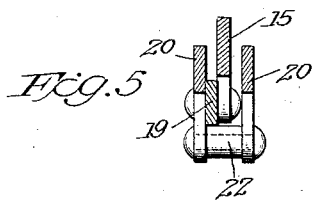
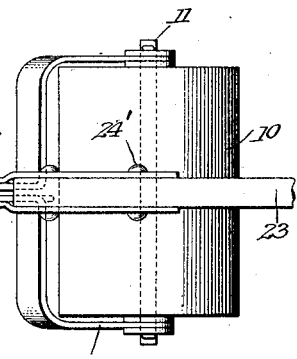
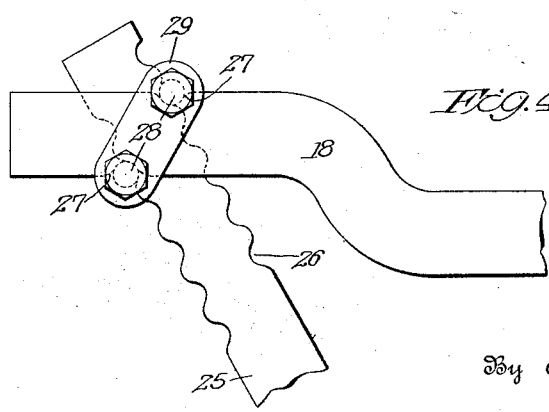
Inventor
Frank Hurka.
By Cushman, Bryant & Darby
Attorneys March 13, 1928.
F. HURKA
GARDEN IMPLEMENT
Original Filed June 10, 1922    2 Sheets-Sheet 2
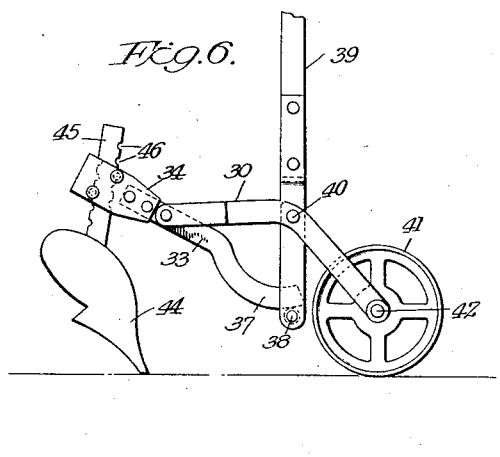
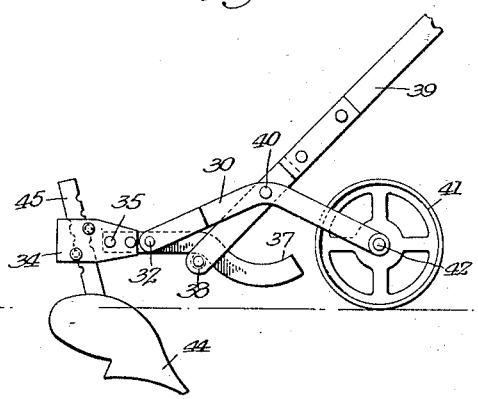
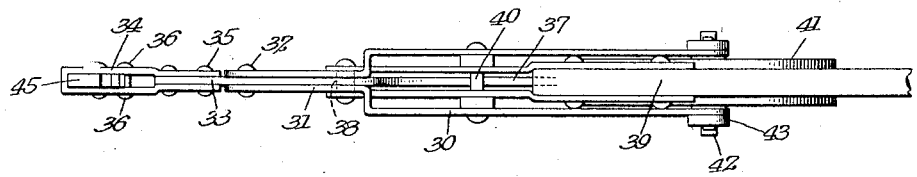
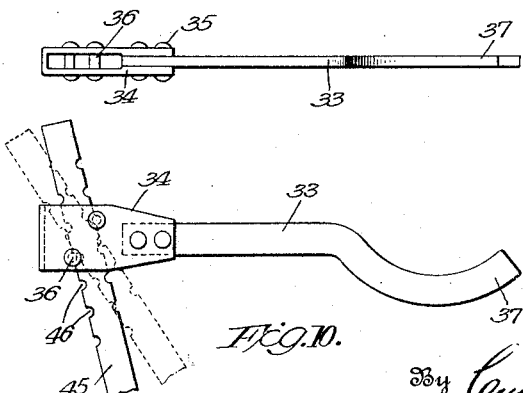
Inventor
Frank Hurka.
By Cushman, Bryant & Darby
Attorneys Patented Mar. 13, 1928.

1,662,673

UNITED STATES PATENT OFFICE.

FRANK HURKA, OF NEW YORK, N. Y.

GARDEN IMPLEMENT.

Application filed June 10, 1922, Serial No. 567,368. Renewed December 6, 1927.

This invention relates to cultivating devices, and more particularly to a hand implement intended for use in a small garden where it is not convenient or necessary to employ the usual plow.

Heretofore, so far as I am aware, in tilling the soil over a limited area, such as a home garden, it has been customary to loosen and turn up the soil by means of a hand spade or similar tool, which is very laborious and tiring, requiring, as it does, constant bending and very wearing exertion.

It is an object of this invention to provide a hand tool which may be operated with a minimum of effort, and which will function in much the same manner as the usual horse or tractor drawn plow.

A further object of the invention is to provide a device which is of simple construction, and which may be economically manufactured and sold at a comparatively low price.

A still further object is to provide a construction in which the tool portion proper, such as a plow or series of cultivator teeth, may be removably and adjustably positioned thereon, permitting variation in the depth of the soil turned up, and also permitting the operator to substitute one tool or ground penetrating element for another.

Another object of the invention is to afford a construction in which the tool portion, such as the plow proper, may, by movement of a suitable draft arm, be forced into the ground with but little effort on the part of the operator. The invention further seeks to insure even penetration of the ground by the tool as the implement is moved along and has as an object the provision of suitable connections between the draft arm and the tool whereby the pull of the operator in employing the implement at the same time maintains the tool proper in the ground.

Additional objects of the invention, such as rigidity and durability of construction, effective operation and other objects of a more minute character which are more intimately connected with the details of construction of the illustrated embodiment of the invention disclosed in the accompanying drawings will become obvious as the description proceeds.

The invention consists, broadly, of an implement comprising a rotatable ground engaging member, such as a wheel having pivotally connected thereto a link having pivotally mounted thereon a beam to which is secured, preferably adjustably and removably, some suitable ground penetrating member, such as a plow or series of cultivator teeth. A draft arm is pivotally connected to the link to operate the same and has an extension engaging the beam so that movement of the arm will effect pivotal movement of the beam to cause the tool to penetrate the ground. The above general description of the device indicates the broader characteristics of the invention, although it will be understood that some of the features mentioned above may be modified without departing from the scope of the invention, which is defined by the prior art and more definitely set forth in the claims following this description.

Referring to the drawings in order to disclose a concrete embodiment of the invention, Fig. 1 is a side elevational view of the device prior to operation, Fig. 2 is a side elevational view showing the draft arm moved to position for operation of the implement and the tool penetrating the ground, Fig. 3 is a top plan view with the parts in the position shown in Fig. 2, Fig. 4 is a detail view showing the connection of the tool to the supporting beam, Fig. 5 is a cross section on the line 5—5 of Fig. 2, looking in the direction of the arrows, Fig. 6 is a side elevational view of a slightly modified embodiment of the invention, Fig. 7 is a view similar to Fig. 6 showing the parts of the implement moved to operative position, Fig. 8 is a top plan view of the implement as shown in Fig. 7, Figure 9 is a top plan of the tool supporting beam, and Fig. 10 is a side elevational view of the beam as shown in Fig. 9.

In the drawings, 10 indicates a rotatable ground engaging wheel or roller mounted upon a shaft 11 having bearings in a yoke 12 which has its parallel juxtaposed portions 13 pivotally connected, by means of a pin 14, to a link 15. The link 15 is pivotally connected adjacent one end to the intermediate portion of a beam 16 by means of a stud or pin 17. The beam has rearwardly and upwardly extending portions 18, and also has a forwardly extending portion 19 between a pair of parallel straps or draft arm extensions 20, which are, at their lower ends, held together by means of a stud 21 having thereon (Fig. 5) a bearing roller 22 positioned beneath the forward extension 19 of the beam 18. The forward extension 19 of the beam may have therein a notch 19' which receives the roller 22 when the draft arm is in operative position for forward movement of the implement. The straps 20 are pivotally connected to the links by means of the link joint pin 14 which extends through the straps, and they are also secured to the lower end of a draft arm 23 as by means of bolts or rivets 24'.

It will be observed that by means of the pin 21 and roller 22 the draft arm is operatively connected to the beam 18 so that pivotal movement of the draft arm about its pivot pin 14 will effect pivotal movement of the beam about its pivot 17. Obviously, the draft arm could be connected to the beam in some other manner, it being simply desirable that the draft arm be operatively associated with the beam so as to produce the pivotal movement above mentioned.

A suitable ground penetrating tool is mounted upon the rearward end of the beam, and, preferably, is adjustably and removably positioned thereon. In the illustrated embodiment of the invention a plow 24 is shown as having a shank arm 25 provided with a plurality of edge notches 26, and the edge of the beam (Fig. 4) is also recessed, as at 27, to receive clamping bolts 28 which extend through clamping plates 29 upon opposite sides of the beam and securely maintain the plow in set position. Obviously, the plow may be removed whenever desirable and another cultivating tool substituted. Also, the bolts may be loosened to permit vertical adjustment of the plow shank arm 25 to vary the depth of penetration of the plow into the ground.

In employing this implement the several parts are initially in their relative positions shown in Fig. 1, with the point of the plow resting upon the ground and the lower end of the draft arm at the end of the forwardly extending portion of the beam 18. The operator exerts a forward and downward pressure upon the draft arm and as a result of the pivotal movement of the draft arm about the pivot pin 14 the beam is moved about its pivot 17, forcing the plow into the ground. As the operator draws the implement along the ground toward the right, as viewed in Fig. 1, the penetration of the tool into the ground continues until the beam 18 is moved to the substantially horizontal position shown in Fig. 2. The draft arm is then inclined at substantially the angle shown in Fig. 2 and the implement may be readily drawn along the ground with the parts in this position by comparatively small effort on the part of the operator.

It will be observed that the lower end of the draft arm is connected to the plow beam a substantial distance below the fulcrum of the draft arm so that the draft arm serves as a lever in forcing the tool beam about its pivot and in thereby urging the tool into the ground. It should also be observed that the draft arm extends upwardly above its fulcrum a much greater distance than below so that the penetration of the plow into the ground is accomplished with little exertion on the part of the operator.

The depth to which the plow or other tool cuts may be varied by adjusting the plow vertically, which is accomplished by loosening the clamps 29 and bolts 27. As may be desired, other ground penetrating tools may be substituted without affecting the operation of the other parts of the device. As the operator draws the implement along the downward pressure on the handle, which is, of course, a component of the pulling force, is multiplied through the leverage exerted by the lower end of the draft arm and through the beam 18, and this leverage is conducted to the plow or other tool. The roller 10 takes up the reaction from the pressure applied at the fulcrum or pivot 14 and permits the device to be drawn along very readily and with small resistance. Due to the provision of the links the roller is free to move forwardly with the link 12 as the implement is moved along relatively to the link 15, movement of the roller and its link 12 taking place about the pivot 14. With this arrangement the unevenness of the ground causing upward and downward movement of the roller 10 and the link 12 will not cause movement of the plow and its beam 18, and, therefore, the distance of penetration of the plow into the ground remains constant as the implement is operated.

In Figs. 6 to 10 there is shown a modified form of the device which will now be described more in detail. The implement comprises a link 30 which may be cast or molded, or, as in the illustrated embodiment of the invention, formed of strip metal. The link comprises two substantially parallel strips 31 carrying between them at their rearward end upon a stud 32 the tool beam 33 which is pivotally mounted upon the stud 32. The tool beam, at its rear end, carries a socket 34 formed of a strip of metal bent upon itself and having its ends 35 secured to the beam 33. The socket has extending therethrough a pair of spaced pins 36 positioned in distinct horizontal and vertical planes. The forward end of the tool beam extends beneath the link 30 and is longitudinally curved downwardly, as at 37, so as to engage a roller 38 upon the lower end of a draft arm 39 which is pivotally mounted upon a stud 40 extending between the strips 31. It will be observed that the draft arm is pivotally mounted upon the link 30 so that the roller 38 upon its lower end is adapted to engage the curved portion 37 of the tool beam in order to move the tool beam about its pivot pin 32 when the draft arm is pivotally moved.

It will be noted from an inspection of Figs. 6 and 7 that the link 30 is also longitudinally curved and its forked forward end straddles a wheel 41, the ends of the strips 31 constituting the link being connected to the axle 42 of the wheel and held thereon by lock nuts 43.

The tool, such as the plow 44, has a shank 45 provided on its opposite edges with a plurality of aligned and spaced notches 46 adapted to receive the pins 36 when the shank is inserted in the socket 34 and between the pins. It will be noted that with this form of tool connecting means it is not necessary to clamp the tool since the engagement of the tool with the ground maintains the pins 36 in the socket 46 and thereby holds the tool in position.

The form of the invention disclosed in Figs. 6 to 10 is of somewhat simpler construction that that disclosed in Figs. 1 to 5 due to the elimination of the links. It will, of course, be understood that the type of beam shown in the modified tool may be readily employed in the type of tool disclosed in Figs. 1 to 5, and, also, that the tool connecting means may be interchangeably employed.

It should be understood that the detailed disclosure of the invention is made merely for purposes of illustration and is in no sense restrictive of the invention, it being possible to modify materially the details of construction shown and described without departing from the scope of the invention.

I claim:

1. In a device of the class described, a pair of links pivotally connected, a rotatable ground engaging member mounted on one of said links, a beam secured to the other of said links, a ground penetrating tool mounted on said beam, a draft arm operatively connected to said links and engaging said beam, said arm upon movement actuating the beam to cause said tool upon forward movement of the device to penetrate the ground.

2. In a device of the class described, a pair of links pivotally connected, a rotatable ground engaging member mounted on one of said links, a beam secured to the other of said links, a ground penetrating tool mounted on said beam, a draft arm pivotally connected to said links and engaging said beam, said arm upon movement actuating the beam to cause said tool upon forward movement of the device to penetrate the ground.

3. In a device of the class described, a pair of links pivotally connected, a rotatable ground engaging member carried by one of said links, a beam pivotally mounted upon the other of said links, the pivot being at at intermediate point along said beam and the beam extending forwardly and rearwardly from said pivot, a ground penetrating tool mounted upon the rearwardly extending portion of said beam, a draft arm pivotally secured to said links and having a portion extending downwardly and operatively connected to the forwardly extending portion of said beam whereby pivotal movement of said arm about its pivot effects a pivotal movement of said beam to cause said tool to penetrate the ground upon forward movement of the device, said arm serving as means for moving the device after the tool has penetrated the ground.

4. In a device of the class described, a pair of links pivotally connected, a rotatable ground engaging member carried by one of said links, a beam pivotally mounted upon the other of said links, the pivot being at an intermediate point along said beam and the beam extending forwardly and rearwardly from said pivot, a ground penetrating tool adjustably mounted upon the rearwardly extending portion of said beam, a draft arm pivotally secured to said links at their pivotal connection and having a portion extending downwardly and connected to the forwardly extending portion of said beam whereby pivotal movement of said arm about its pivot effects a pivotal movement of said beam to cause said tool to penetrate the ground upon forward movement of the device, said arm serving as means for moving the device after the tool has penetrated the ground.

In testimony whereof I have hereunto set my hand.

FRANK HURKA.